United States Patent
Williamson et al.

(10) Patent No.: US 7,138,615 B1
(45) Date of Patent: Nov. 21, 2006

(54) CONTROL SYSTEM FOR MICROWAVE REGENERATION FOR A DIESEL PARTICULATE FILTER

(75) Inventors: Weldon S. Williamson, Malibu, CA (US); Eugene V. Gonze, Pinckney, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/194,096

(22) Filed: Jul. 29, 2005

(51) Int. Cl.
*H05B 6/64* (2006.01)
*B01D 39/00* (2006.01)

(52) U.S. Cl. ..................... 219/679; 55/282.2
(58) Field of Classification Search .............. 219/679, 219/678, 680; 123/196 A, 198 E; 95/278; 55/282.2, 282.5
See application file for complete search history.

(56) References Cited

U.S. PATENT DOCUMENTS

| | | | |
|---|---|---|---|
| 5,180,559 A * | 1/1993 | Ma | 422/168 |
| 5,194,078 A * | 3/1993 | Yonemura et al. | 55/466 |
| 5,195,317 A * | 3/1993 | Nobue et al. | 60/275 |
| 6,379,407 B1 * | 4/2002 | Blackwell et al. | 55/282.3 |
| 6,540,816 B1 * | 4/2003 | Allie et al. | 95/278 |
| 6,709,489 B1 | 3/2004 | Ament et al. | |
| 2002/0069756 A1 | 6/2002 | Mako et al. | |
| 2002/0092422 A1 | 7/2002 | Ament et al. | |
| 2004/0011024 A1 | 1/2004 | Williamson et al. | |

* cited by examiner

*Primary Examiner*—Daniel Robinson
(74) *Attorney, Agent, or Firm*—Christopher DeVries

(57) ABSTRACT

A microwave system having a microwave source that generates microwave signals for regenerating a diesel particulate filter (DPF) includes a sampling device that samples a power level of reflected microwave signals from the DPF and a regulator module that communicates with the microwave source and the sampling device. The regulator module further adjusts operation of the microwave source based on the power level of the reflected microwave signals and a predetermined power threshold.

7 Claims, 4 Drawing Sheets

CONTROL SYSTEM FOR MICROWAVE REGENERATION FOR A DIESEL PARTICULATE FILTER

STATEMENT OF GOVERNMENT SUPPORT

This invention was made with Government support under DE-FC04-03AL67635. The Government has certain rights in this invention.

FIELD OF THE INVENTION

The present invention relates to vehicle exhaust systems, and more particularly to controlling operation of a microwave regeneration system of a diesel particulate filter.

BACKGROUND OF THE INVENTION

Diesel engine operation involves combustion that generates exhaust gas. During combustion, an air/fuel mixture is delivered through an intake valve to cylinders and is combusted therein. After combustion, the piston forces exhaust gas in the cylinders into an exhaust system. The exhaust gas may contain diesel particulates generally characterized as soot.

A diesel particulate filter (DPF) can be used to reduce the level of soot in the exhaust gas. The DPF typically includes a separation medium and an inner cavity having small pores that capture soot. Exhaust gas flows through the pores and soot accumulates on the walls. As the accumulation increases, exhaust flow may be blocked and pressure increases inside the DPF. The DPF can be regenerated using microwave radiation to burn off soot and allow the flow of exhaust gas to reduce pressure. DPFs may be coated with a magnetic microwave absorbing material, such as ferrite, to concentrate microwave absorption in areas where soot accumulates.

Microwave systems used to regenerate DPFs typically include a microwave source and a power supply. Microwaves are directed into the DPF cavity and are absorbed by the absorbing material. Heat from the microwaves causes the temperature of the absorbing material to increase, thereby causing accumulated soot to combust. Once combusted, heat from a small amount of soot is leveraged to burn a larger amount. When the temperature of the absorbing material exceeds a Curie temperature, the material loses the ability to absorb. Microwaves that are not absorbed are reflected back toward the microwave source and are dissipated as heat.

SUMMARY OF THE INVENTION

Accordingly, the present invention provides a microwave system having a microwave source that generates microwave signals for regenerating a diesel particulate filter (DPF). The microwave system includes a sampling device that samples a power level of reflected microwave signals from the DPF and a regulator module that communicates with the microwave source and the sampling device. The regulator module further adjusts operation of the microwave source based on the power level of the reflected microwave signals and a predetermined power threshold.

In one feature, the microwave system further includes a comparator module that communicates with the regulator module and the sampling device and that compares the power level to the predetermined power threshold.

In another feature, the microwave source communicates with a first antenna that extends inside the DPF.

In another feature, the microwave source is connected to a power supply that is operable in an on and an off state.

In still another feature, the diesel particulate filter includes a second antenna that communicates the power level signals to the comparator module.

In yet another feature, the regulator module switches off the power supply when the power level of the reflected microwaves exceeds the predetermined threshold.

In still another feature, the power level signal is indicative of a power level of the reflected microwaves.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
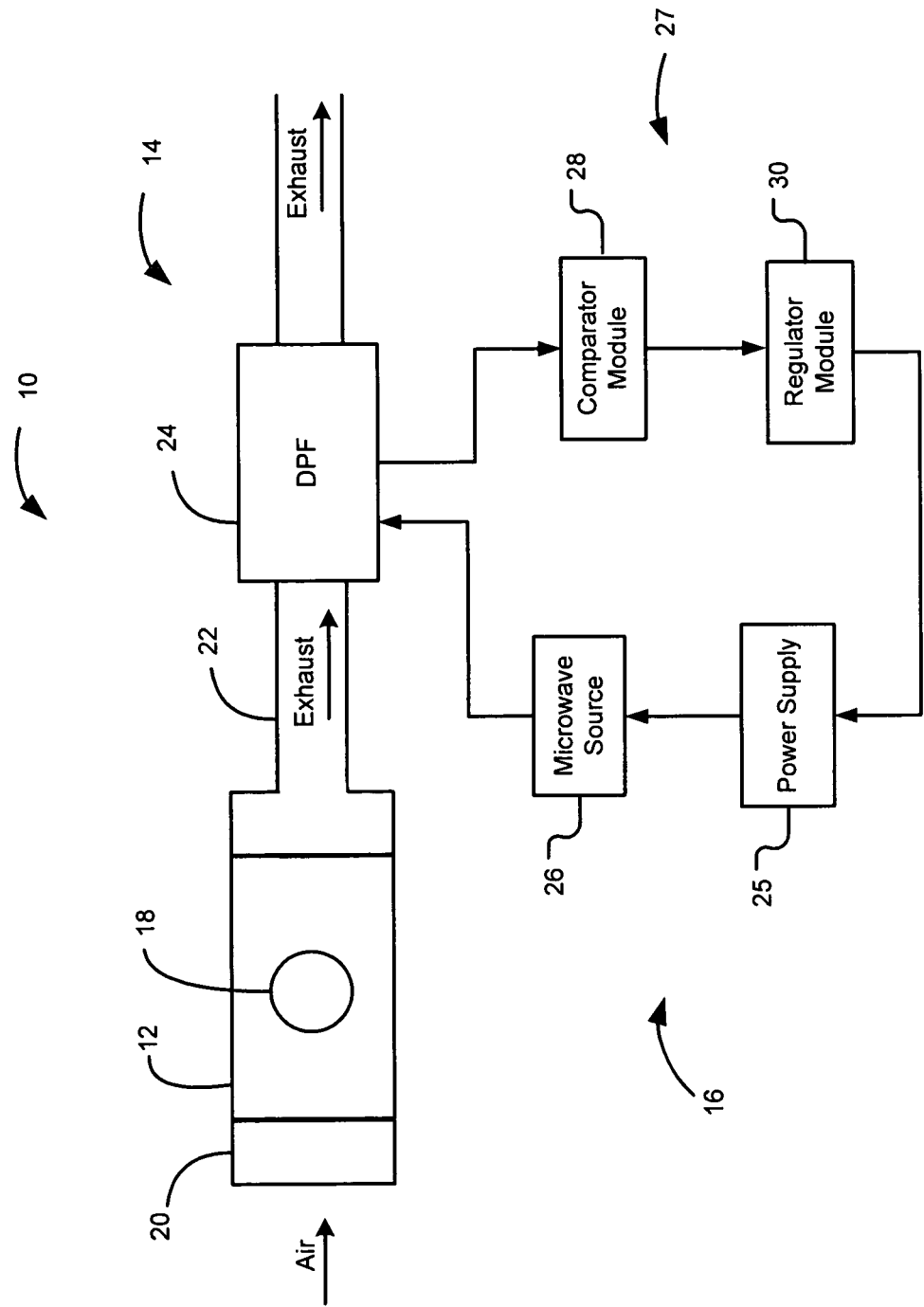
FIG. 1 is a functional block diagram of a diesel engine system including a microwave regeneration system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit and/or other suitable components that provide the described functionality.

Referring now to FIG. 1, a diesel engine system 10 is schematically illustrated. The diesel engine system 10 includes a diesel engine 12, an exhaust system 14 and a microwave system 16. The diesel engine 12 includes a cylinder 18 and an intake manifold 20. Air flows into the engine 12 through the intake manifold 20. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before releasing the exhaust gas to the atmosphere. The exhaust system 14 includes an exhaust manifold 22 and a diesel particulate filter (DPF) 24. The exhaust manifold 22 directs exhaust gas exiting the cylinder 18 through the DPF 24. The exhaust gas is treated by the DPF 24 to reduce emissions. More specifically, pores inside the DPF cavity trap diesel particulates (i.e., soot) associated with the exhaust gas. The pores are coated with or formed from microwave absorbing material, such as ferrite.

The microwave system 16 includes a power supply 25 that selectively operates in an off and on mode, and a microwave source 26 that generates microwaves. The microwaves are absorbed by the microwave absorbing material. Heat burns away soot and regenerates the DPF 24, as discussed in greater detail below. The microwave system 16 further utilizes a control system 27 including a comparator module 28 and a regulator module 30 that adjust the operation of the microwave system 16 as discussed further below.

Figure 2:
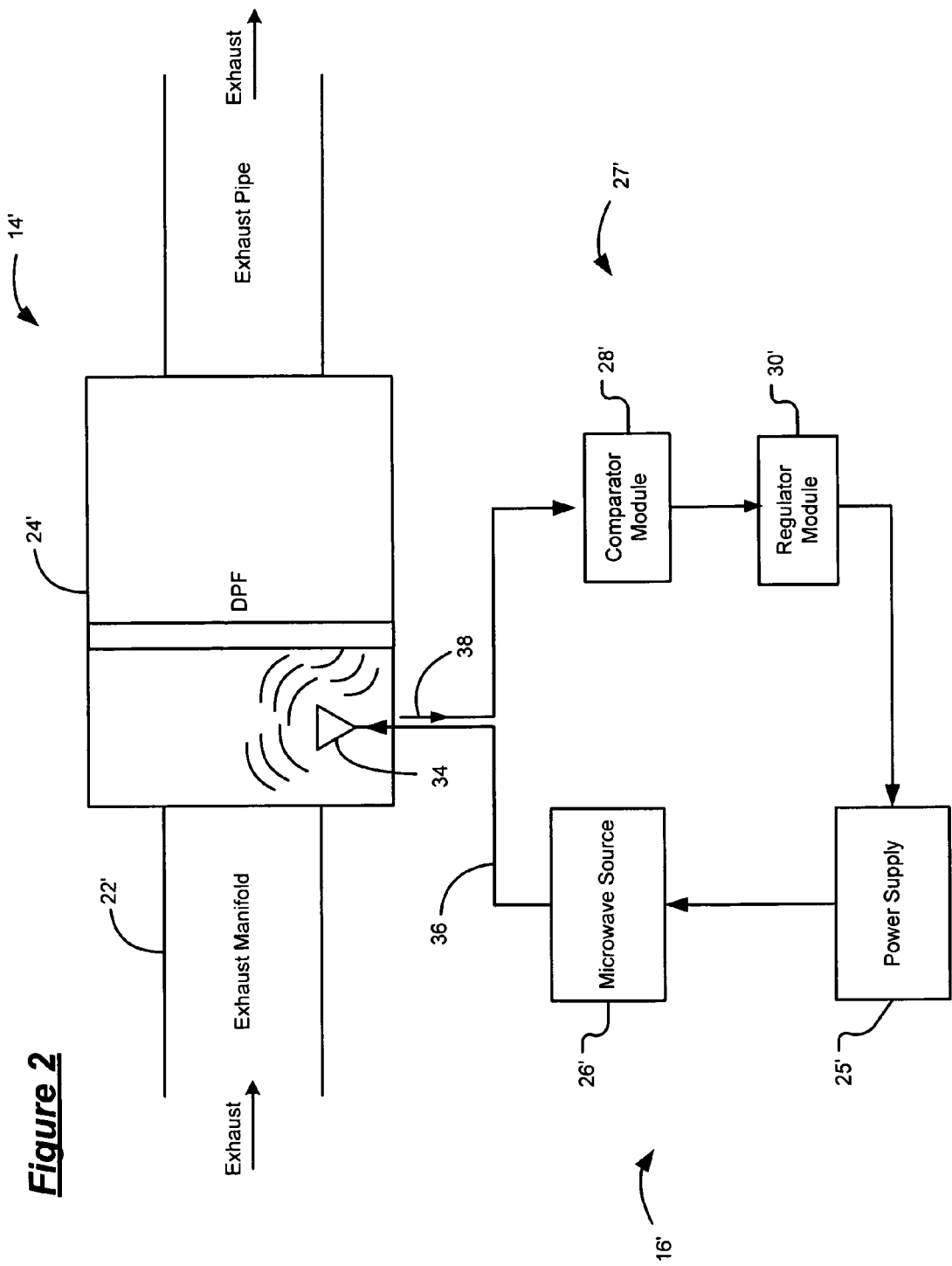
FIG. 2 is a functional block diagram of a microwave regeneration system including a control system according to the present invention.

Referring now to FIG. 2, a microwave system 16' is illustrated in greater detail. The microwave system 16' is similar to the microwave system 16 described in detail above. Therefore, like reference numerals will be used to indicate like components. The microwave system 16' includes a microwave source 26', a power supply 25', a first antenna 34 and a control system 27'. The microwave source 26' generates microwaves using power from the power supply 25'. The microwaves are directed to the first antenna 34 by a waveguide 36. The waveguide 36 can include a co-axial cable or another device for directing the microwaves to the first antenna 34. The first antenna 34 extends inside the DPF cavity and emits microwaves to burn away accumulated soot.

The control system 27' includes a microwave sampling device 38, a comparator module 28' and a regulator module 30'. The microwave sampling device 38 is coupled to the DPF 24' and extends inside the DPF cavity to communicate a power level signal to the comparator module 28'. The power level signal ($P_{RFL}$) indicates the power level of the reflected microwave signals. The comparator module 28 compares the power level of the power level signal to a predetermined power level. The regulator module 30' communicates with the comparator module 28' and adjusts the power level of the microwaves based on the comparison, as discussed further below.

The comparator module 28' compares the power level signal ($p_{RFL}$) to the predetermined power threshold value ($p_{THR}$). The result is communicated to the regulator module 30'. When $p_{RFL}$ exceeds $p_{THR}$, the regulator module 30' generates a signal that switches the power supply 25' off to inhibit the generation of microwaves.

The control system 27' further verifies that the DPF 24' and the microwave system 16' are operating properly. The DPF cavity includes absorbing material having a predetermined Curie temperature ($T_{CURIE}$). Heating the material to $T_{CURIE}$ causes surrounding soot to combust. When $p_{RFL}$ exceeds $p_{THR}$, the regulator module 30' assumes that the soot combustion temperature was met and that the microwave system 16' is properly regenerating the DPF 24'. Furthermore, the regulator module 30' may compare the on-time of the microwave source 26' to a predetermined time period indicating a time period when power level signals are expected to be received ($t_{NO\_RFL}$). The $t_{NO\_RFL}$ parameter can be determined by measuring the time when the absorbing material reaches $T_{CURIE}$ subsequent to powering the microwave source 26'. For example, the Curie temperature of ferrite is approximately 500 Degrees Celsius. Based on experimentation, microwaves will cause the ferrite to reach the $T_{CURIE}$ in approximately 30 seconds. Thereafter, microwaves will be reflected back toward the microwave source 24'. After microwaves are generated, the regulator module 30' will compare the on-time of the microwave source 26' ($t_{ON}$) to $t_{RFL}$. If power level signals associated with the reflected microwaves have not been received after 30 seconds, the regulator module 30' outputs a signal indicating a fault and switches off the power supply 25.

A damaged DPF may intensify the power level of the reflected microwaves. In this case, microwave signals are reflected instead of absorbed and the DPF 24' is inadequately regenerated. The regulator module 30' compares $t_{NO\_RFL}$ to a time when $P_{RFL}$ exceeds $P_{RFL\_THR}$ ($t_{PRF>THR}$). If $t_{PRF>THR}$ occurs prior to $t_{NO\_RFL}$, the regulator module 30' outputs a signal indicating a fault.

Additionally, intensified reflected microwave signals may cause $p_{RFL}$ to exceed $p_{THR}$ for a greater length of time subsequent to switching off the microwave source. For instance, after switching the microwave source 26' off, $p_{RFL}$ typically falls below $p_{THR}$ after approximately 3 milliseconds. If the DPF 24' is damaged, the power level of the reflected microwaves may take approximately 9 milliseconds to decrease below $p_{THR}$.

The control system 27' analyzes the power level of the reflected signal after switching off the microwave source 24'. When the microwave source 26' is switched off, the comparator module 28' resets the timer and monitors the off-time. After the microwave source 24' remains off for a predetermined time period ($t_{OFF}$), the comparator module 28' compares $p_{RFL}$ and $p_{THR}$. When $p_{RFL}$ exceeds $p_{THR}$, the regulator module 30' outputs a signal indicating a fault.

Figure 3:
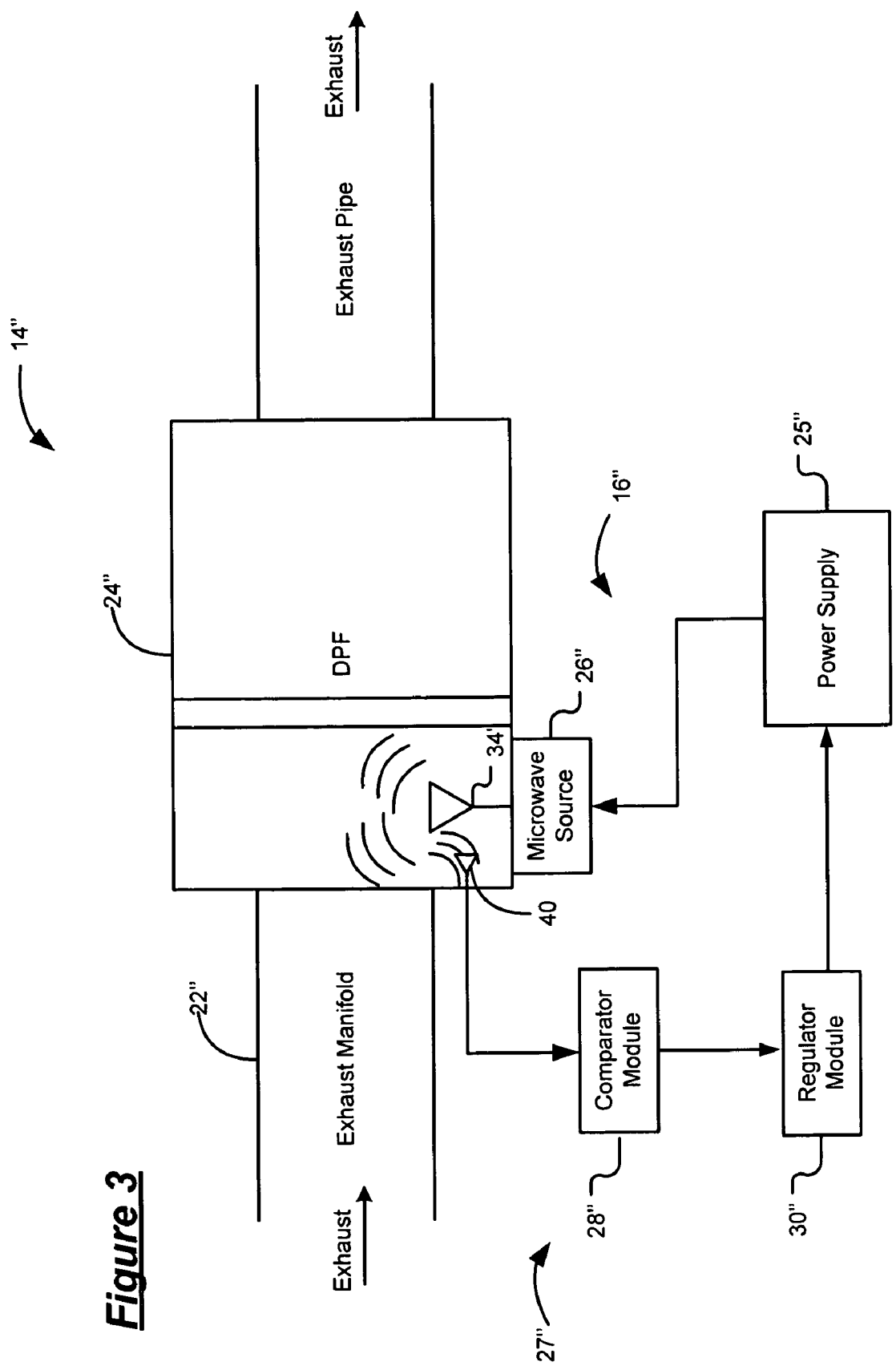
FIG. 3 is a functional block diagram illustrating an alternative arrangement of a microwave regeneration system including a control system and a diesel particulate filter adapted to sense reflected microwaves according to the present invention.

Referring now to FIG. 3, an alternative diesel system 10'', including an exhaust system 14'' and microwave system 16'', is schematically illustrated. The exhaust system 14'' includes a DPF 24'' fabricated with at least one sensing port (not shown). A second antenna 40 is coupled to the sensing port. The second antenna 40 extends into the DPF cavity and communicates with the comparator module 28''.

The microwave system 16'' includes a microwave source 26'', a power supply 25'', a first antenna 34' and a control system 27''. The power supply 25'' is selectively operable in an on and an off mode and is connected to the microwave source 26''. The microwave source 26'' is coupled directly to the DPF 24''. A first antenna 34' is coupled to the microwave source 26'' and extends inside the DPF cavity. The microwave source 26'' excites the first antenna 34' to emit microwave radiation inside the DPF cavity. The second antenna 40 communicates a power level signal to the comparator module 28''. The power level signal ($P_{RFL}$) indicates the power level at a specific location within the DPF cavity. This location is chosen so that the power level received by the second antenna 40 will increase substantially under conditions in which microwaves emitted by the first antenna 34' are reflected instead of absorbed. The regulator module 30'' adjusts the operation of the microwave source based 26'' on the comparison of $p_{RFL}$ and $p_{THR}$. The variable $p_{RFL}$ can refer to the power level detected by the sampling device 38 described in FIG. 2 or can refer to the power level detected by the second antenna 40 described in FIG. 3. In the discussion that follows, we retain the variable name $p_{RFL}$ for both quantities, since the logic using these quantities is the same for both cases.

Figure 4:
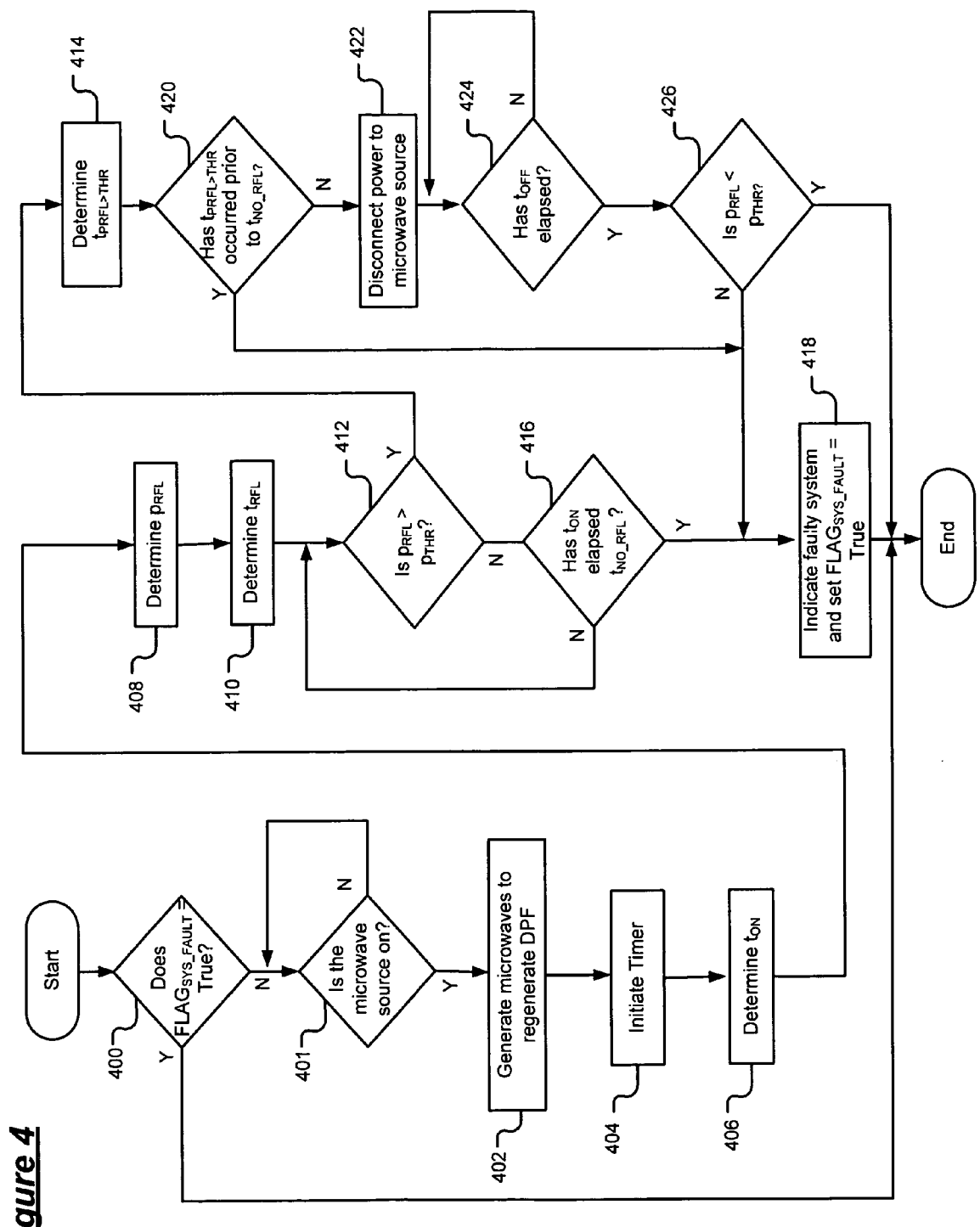
FIG. 4 is a flowchart illustrating steps executed by a microwave regeneration system according to the present invention.

Referring now to FIG. 4, a flowchart illustrates steps executed by the microwave system 16 according to the present invention. In step 400, control determines whether $FLAG_{SYS-FAULT}$ is true. If $FLAG_{SYS-FAULT}$ is true, control ends to prevent the microwave system 16 from operating improperly. If $FLAG_{SYS-FAULT}$ FAULT is not true, control proceeds to step 401. In step 401, control determines whether the microwave source 26 has been switched on. If the microwave source 26 is off, control returns to step 401. Otherwise, the microwave source 26 generates microwaves in step 402. In step 404, control initiates a timer that monitors the on-time of the microwave source 26 ($t_{ON}$). Control determines $t_{ON}$ in step 406. In step 408, control determines the power level of reflected microwaves ($p_{RFL}$). Control determines the time when the power level signals are initially received ($t_{RFL}$) in step 410. In step 412, control compares $p_{RFL}$ to $p_{THR}$. If $p_{RFL}$ exceeds $p_{THR}$, then control determines $t_{PRF>THR}$ in step 414. If $p_{RFL}$ has not occurred, control determines whether the microwave source 26 has been operating for a time period that typically produces reflected microwaves in step 416. Specifically, control compares $t_{ON}$ to $t_{NO\_RFL}$. If $t_{ON}$ has not elapsed $t_{NO\_RFL}$, then control returns to comparing $p_{RFL}$ to $p_{THR}$ in step 412. Otherwise, control sets $FLAG_{SYS\_FAULT}$ to true and indicates a fault in step 418.

After determining, $t_{PRF>THR}$, control determines whether $t_{PRF>THR}$ has occurred prior to $t_{NO\_RFL}$ in step 420. If $t_{PRF>THR}$ has occurred prior to $t_{NO\_RFL}$, then the DPF 24 is likely damaged and control indicates a fault in step 418. Otherwise, control disconnects power to the microwave source 26 in step 422.

A further indication the DPF 24 may be damaged is the failure of $p_{RFL}$ to properly subside after power to the microwave source 26 has been disconnected for a predetermined time period ($t_{OFF}$). In step 424, control determines whether $t_{OFF}$ has elapsed. If $t_{OFF}$ has not elapsed, then control returns to step 424. Otherwise, control determines whether $p_{RFL}$ has decreased below $p_{THR}$ in step 426. When $p_{RFL}$ has not decreased below $p_{THR}$, control determines the DPF 24 is likely damaged. Therefore, control indicates a faulty system and sets $FLAG_{SYS\_FAULT}$ to true in step 418, and control ends. If $p_{RFL}$ has decreased below $p_{THR}$, then control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A microwave system having a microwave source that generates microwave signals for regenerating a diesel particulate filter (DPF), comprising:
    a sampling device that samples at least one of a power level of reflected microwave signals from the DPF and a power level within the DPF cavity that is indicative of microwave power being reflected from the cavity back to the microwave source; and
    a regulator module that communicates with said microwave source and said sampling device and that adjusts operation of said microwave source based on the power level of the reflected microwave signals and a predetermined power threshold.

2. The microwave system of claim 1 further comprising a comparator module that communicates with said regulator module and said sampling device and that compares said power level to said predetermined power threshold.

3. The microwave system of claim 1 wherein the microwave source communicates with a first antenna that extends inside the DPF.

4. The microwave system of claim 1 wherein said microwave source is connected to a power supply that is operable in an on and an off state.

5. The microwave system of claim 1 wherein the diesel particulate filter includes a second antenna that communicates said power level signals to said comparator module.

6. The microwave system of claim 1 wherein said regulator module switches off said power supply when said power level of said reflected microwaves exceeds said predetermined threshold.

7. The microwave system of claim 1 wherein said power level signal is indicative of a power level of said reflected microwaves.

* * * * *